United States Patent
Coldwate et al.

(10) Patent No.: US 12,480,527 B2
(45) Date of Patent: Nov. 25, 2025

(54) HIGH-POWER AIR-COOOLED COMPRESSOR MOTOR AND LOW-POWER COOLING BOOSTER FAN MOTOR POWERED BY SINGLE INVERTER

(71) Applicant: Hamilton Sundstrand Corporation, Charlotte, NC (US)

(72) Inventors: Joseph K. Coldwate, Roscoe, IL (US); Andreas C. Koenig, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 369 days.

(21) Appl. No.: 17/961,852

(22) Filed: Oct. 7, 2022

(65) Prior Publication Data

US 2024/0117818 A1     Apr. 11, 2024

(51) Int. Cl.
| | |
|---|---|
| F04D 29/58 | (2006.01) |
| B64D 13/02 | (2006.01) |
| B64D 37/00 | (2006.01) |
| F04D 17/10 | (2006.01) |
| F04D 25/06 | (2006.01) |
| F04D 25/16 | (2006.01) |

(52) U.S. Cl.
CPC ........... *F04D 29/588* (2013.01); *B64D 13/02* (2013.01); *B64D 37/00* (2013.01); *F04D 17/10* (2013.01); *F04D 25/06* (2013.01); *F04D 25/166* (2013.01)

(58) Field of Classification Search
CPC ........ F04D 29/588; F04D 17/10; F04D 25/06; F04D 25/166; B64D 13/02; B64D 37/00; B64D 13/06; B64D 2013/0644
See application file for complete search history.

(56) References Cited

U.S. PATENT DOCUMENTS

| | | | |
|---|---|---|---|
| 4,487,034 A * | 12/1984 | Cronin | F25B 27/00 62/196.3 |
| 6,133,699 A | 10/2000 | Vrionis et al. | |
| 6,155,062 A | 12/2000 | Santarnecchi | |
| 7,302,804 B2 * | 12/2007 | Murry | H02K 9/12 62/401 |
| 7,504,784 B2 | 3/2009 | Asada et al. | |
| 8,125,164 B2 | 2/2012 | White | |
| 10,931,170 B2 * | 2/2021 | Parlante | B64D 37/32 |
| 11,215,477 B2 | 1/2022 | Palanca et al. | |

(Continued)

FOREIGN PATENT DOCUMENTS

| | | |
|---|---|---|
| EP | 2407380 A2 | 1/2012 |
| EP | 3401223 A1 | 11/2018 |

(Continued)

OTHER PUBLICATIONS

European Search Report Issued in European Patent Application No. 23198535.9, mailed Jan. 30, 2024; 8 pages.

*Primary Examiner* — Andrew J Marien
(74) *Attorney, Agent, or Firm* — CANTOR COLBURN LLP

(57) ABSTRACT

An aircraft includes a compression system for pressurizing a cabin of the aircraft. The air compression system includes a first motor, a second motor and an inverter. The first motor compresses air at a compressor to pressurize the cabin, thereby generating heat. The second motor circulates a cooling air to cool the compressor. The inverter provides power to both the first motor and the second motor.

16 Claims, 2 Drawing Sheets

(56) References Cited

U.S. PATENT DOCUMENTS

| | | |
|---|---|---|
| 11,260,983 B2 | 3/2022 | Swann et al. |
| 11,342,875 B2 | 5/2022 | Koenig et al. |
| 2005/0151019 A1* | 7/2005 | Stevens .................. B64D 37/32 |
| | | 244/135 R |

FOREIGN PATENT DOCUMENTS

| | | |
|---|---|---|
| EP | 3428069 A1 | 1/2019 |
| JP | 6785727 B2 | 11/2020 |
| WO | 2021038868 A1 | 3/2021 |

* cited by examiner

HIGH-POWER AIR-COOOLED COMPRESSOR MOTOR AND LOW-POWER COOLING BOOSTER FAN MOTOR POWERED BY SINGLE INVERTER

BACKGROUND

Exemplary embodiments pertain to the art of cooling a compression system of an aircraft. Aircraft generally include compressors that are used to pressurize a cabin of the aircraft. Operation of the compressor generates heat. Thus, the compressor generally needs to be cooled. Passive cooling methods can be used to cool the compressor by directing air to flow passively around it. However, under some aircraft conditions, the passive air flow is generally inadequate to fully cool a high-powered compressor.

BRIEF DESCRIPTION

According to one embodiment, a method of pressurizing a cabin of an aircraft is disclosed. A first motor of a compressor of the aircraft is operated to pressurize the cabin, wherein operation of the first motor generates heat. A second motor is operated for circulating a cooling air to cool the compressor. The first motor and the second motor are powered via an inverter.

In addition to one or more of the features described herein, the first motor and the second motor are connected to the inverter in parallel.

In addition to one or more of the features described herein, the method includes turning on and off the first motor and the second motor in unison.

In addition to one or more of the features described herein, the method includes disposing the second motor in one of an air inlet of the compressor and an exhaust line of a cooling chamber of the compressor.

In addition to one or more of the features described herein, a first power output of the first motor is greater than a second power output of the second motor.

In addition to one or more of the features described herein, the first motor is a permanent magnet motor and the second motor is an induction motor.

In addition to one or more of the features described herein, the second motor operates a booster fan.

According to another embodiment, an aircraft is disclosed. The aircraft includes an air compression system for pressurizing a cabin of the aircraft. The air compression system includes a first motor for compressing air at a compressor, a second motor for circulating a cooling air to cool the compressor, and an inverter for powering the first motor and the second motor.

In addition to one or more of the features described herein, the first motor and the second motor are connected to the inverter in parallel.

In addition to one or more of the features described herein, the first motor and the second motor are turned on and off in unison.

In addition to one or more of the features described herein, the compression system further includes a cooling chamber fluidly coupled to an air inlet of the compressor and having an exhaust line, wherein the second motor is located in one of the air inlet and the exhaust line.

In addition to one or more of the features described herein, a first power output of the first motor is greater than a second power output of the second motor.

In addition to one or more of the features described herein, the first motor is a permanent magnet motor and the second motor is an induction motor.

In addition to one or more of the features described herein, the first motor operates a compressor fan of the compressor and the second motor operates a booster fan.

In addition to one or more of the features described herein, wherein the inverter is a three-phase inverter.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
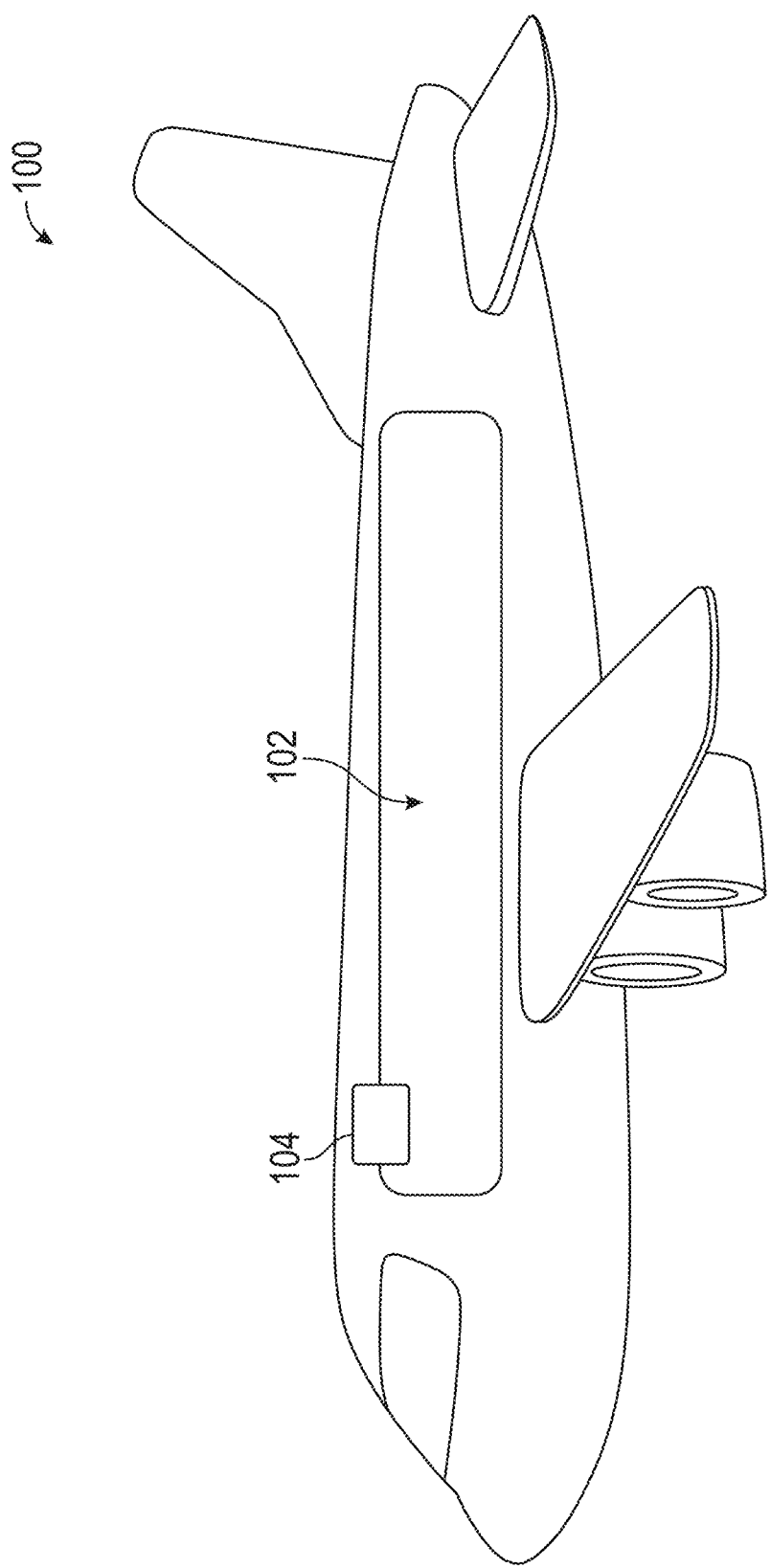
FIG. 1 shows an aircraft in an illustrative embodiment.

FIG. 1 shows an aircraft 100 in an illustrative embodiment. The aircraft includes a cabin 102 and an air compression system 104 for pumping pressurized air into the cabin to create a safe and comfortable environment for passengers and crew flying at high altitudes.

Figure 2:
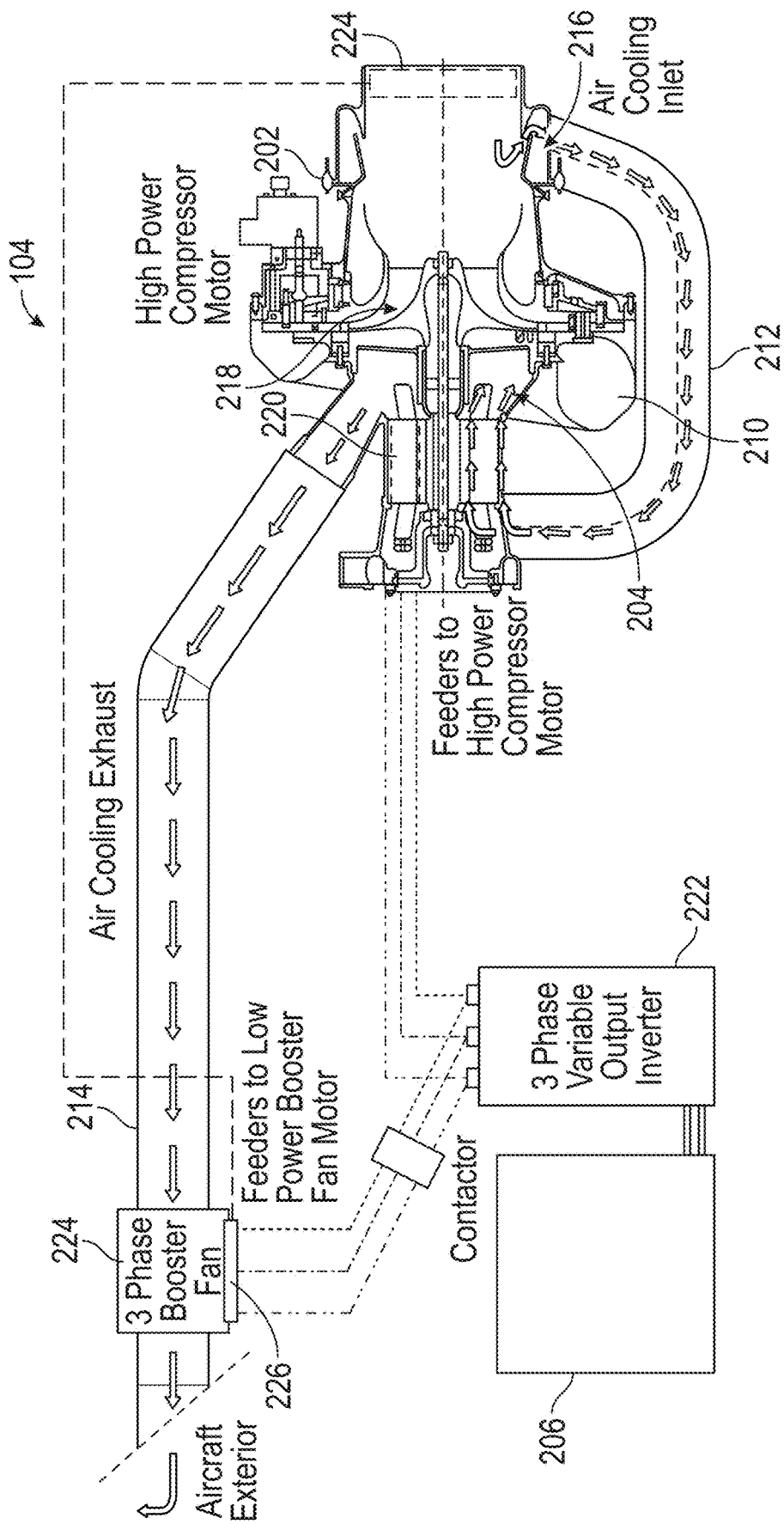
FIG. 2 shows the air compression system of the aircraft in an illustrative embodiment.

FIG. 2 shows the air compression system 104 in an illustrative embodiment. The air compression system 104 includes a compressor 202, a cooling chamber 204 for air flow to cool the compressor 202, and a power source 206. The compressor 202 has an air inlet 208 and an air outlet 210. Air is drawn into the compressor 202 from an environment outside of a cabin 102 of the aircraft 100 at the air inlet 208 and is pumped into the cabin at the air outlet 210. The cooling chamber 204 provides a volume around an outside of the compressor 202 through which air can circulate to cool the compressor 202. A cooling line 212 connects to the cooling chamber 204 for ingress of air for cooling ("cooling air") into the chamber. An exhaust line 214 connects to the cooling chamber 204 for egress of the cooling air from the cooling chamber 204. The cooling line 212 includes a cooling line inlet 216 that is in fluid communication with the air inlet 208. The cooling air is drawn from the air inlet 208 into the cooling line 212 via the cooling line inlet 216, through the cooling chamber 204, and out of the cooling chamber 204 via the exhaust line 214. From the exhaust line 214, the cooling air is released to an outside environment or exterior of the aircraft 100.

A compressor fan 218 of the compressor 202 draws air into the compressor 202 via the air inlet 208 and forces the air out of the compressor 202 (and into the cabin 102) via the air outlet 210. In various embodiments, a first motor 220 is used to operate the compressor fan 218. The first motor 220 can be a high-powered motor that has a power output in a range of about 100 kilowatts (kW). In various embodiments, the first motor 220 is a permanent magnet motor. The first motor 220 draws power from the power source through an inverter 222 electrically coupled between the power source 206 and the first motor 220. In various embodiments, the inverter 222 is a three-phase inverter.

A booster fan 224 is located in either the air inlet 208 or the exhaust line 214 to generate a pressure differential (in either the air inlet 208 or the exhaust line 214) that increases airflow through the cooling chamber 204. The increase in airflow refers to an increase in velocity of the air in the cooling chamber 204 in comparison to the velocity of air that occurs during passive airflow. The increased airflow helps to circulate air for cooling the first motor 220. The booster fan 224 is operated using a second motor 226. The second motor 226 can be low power motor that has a second power output that is less than the first power output of the first motor 220. In various embodiments, the second power output is in a range of about 1 kW. In various embodiment, the second motor is an induction motor. The second motor 226 draws its power from the power source 206 via the inverter 222, which is electrically coupled between the second motor 226 and the power source 206. A pole count and winding of the second motor 226 can be selected to obtain a selected speed for the power output of the inverter 222.

The first motor 220 and the second motor 226 are connected to the inverter 222 in parallel. In various embodiments, the first motor 220 and the second motor 226 can be turned on and off in unison via the inverter 222. Operating the first motor 220 and the second motor 226 in parallel takes advantage of the existing inverter already in the aircraft.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of pressurizing a cabin of an aircraft, comprising:
    operating a first motor of a compressor of the aircraft to pressurize the cabin, wherein operation of the first motor generates heat;
    operating a second motor for circulating a cooling air through a cooling chamber that provides a volume around an outside of the compressor to cool the compressor; and
    powering the first motor and the second motor via an inverter.

2. The method of claim 1, wherein the first motor and the second motor are connected to the inverter in parallel.

3. The method of claim 1, further comprising turning on and off the first motor and the second motor in unison.

4. The method of claim 1, wherein the second motor is connected to a fan located in one of an air inlet of the compressor and an exhaust line of the cooling chamber.

5. The method of claim 1, wherein a first power output of the first motor is greater than a second power output of the second motor.

6. The method of claim 1, wherein the first motor is a permanent magnet motor and the second motor is an induction motor.

7. The method of claim 1, wherein the second motor operates a booster fan.

8. An aircraft, comprising:
    an air compression system for pressurizing a cabin of the aircraft, the air compression system comprising:
    a compressor;
    a cooling chamber that provides a volume around an outside of the compressor;
    a first motor for compressing air at the compressor;
    a second motor for circulating a cooling air through the cooling chamber to cool the compressor; and
    an inverter for powering the first motor and the second motor.

9. The aircraft of claim 8, wherein the first motor and the second motor are connected to the inverter in parallel.

10. The aircraft of claim 8, wherein the first motor and the second motor are turned on and off in unison.

11. The aircraft of claim 8, wherein the cooling chamber is fluidly coupled to an air inlet of the compressor and having has an exhaust line, wherein the second motor is connected to a fan that is located in one of the air inlet and the exhaust line.

12. The aircraft of claim 8, wherein a first power output of the first motor is greater than a second power output of the second motor.

13. The aircraft of claim 8, wherein the first motor is a permanent magnet motor and the second motor is an induction motor.

14. The aircraft of claim 8, wherein the first motor operates a compressor fan of the compressor and the second motor operates a booster fan.

15. The aircraft of claim 8, wherein the inverter is a three-phase inverter.

16. The aircraft of claim 11, wherein the cooling chamber includes an air cooling inlet that is in fluid communication with the inlet, the air inlet of the compressor.

* * * * *